Jan. 26, 1926.
E. H. WRIGHT
1,571,080
TESTING APPARATUS FOR USE IN COW MILKERS
Filed Nov. 15, 1922    3 Sheets-Sheet 1
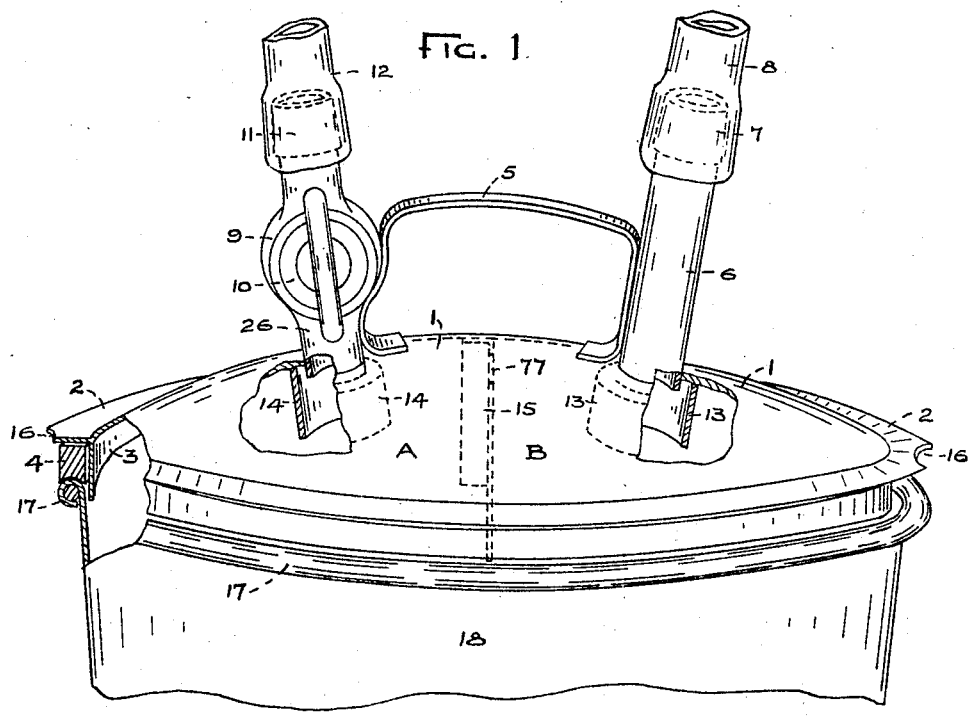
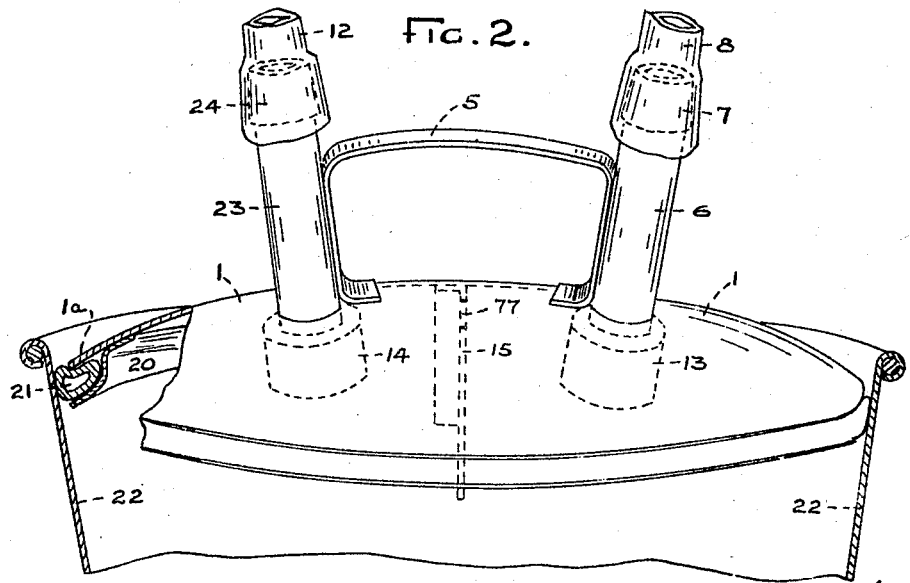
Inventor
E. H. Wright

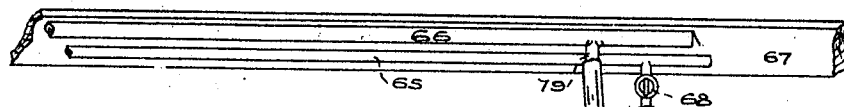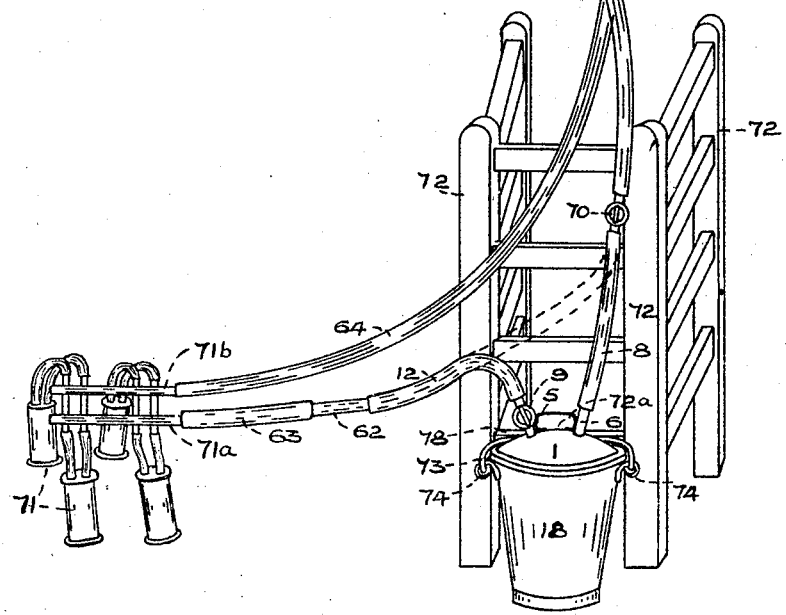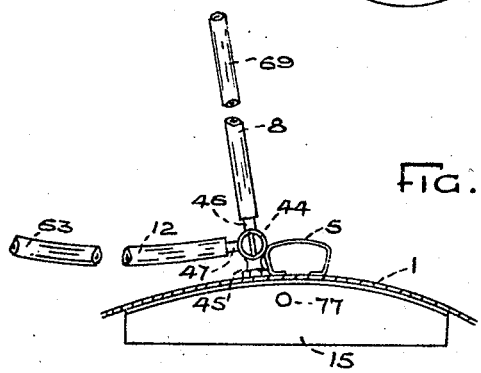

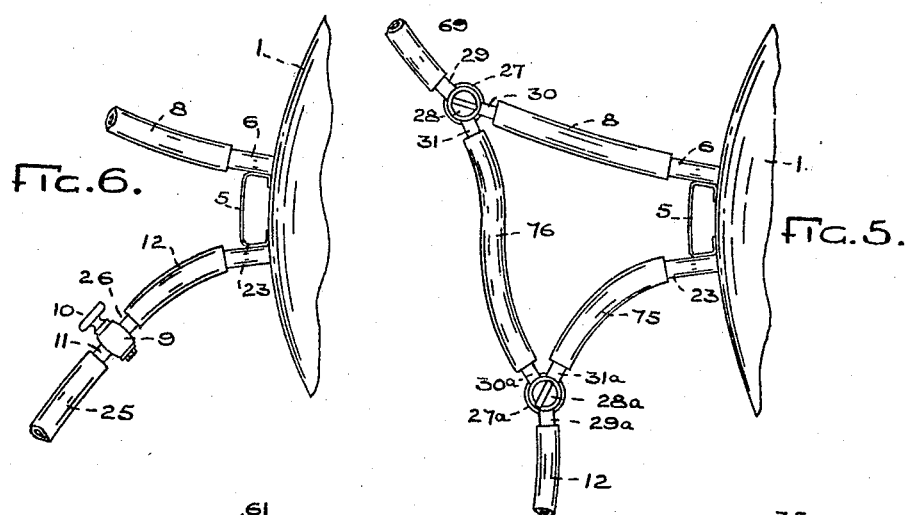
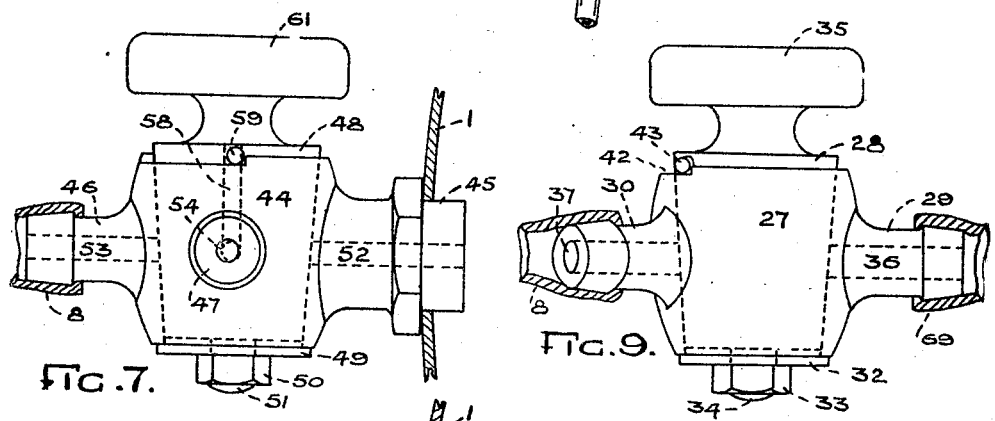
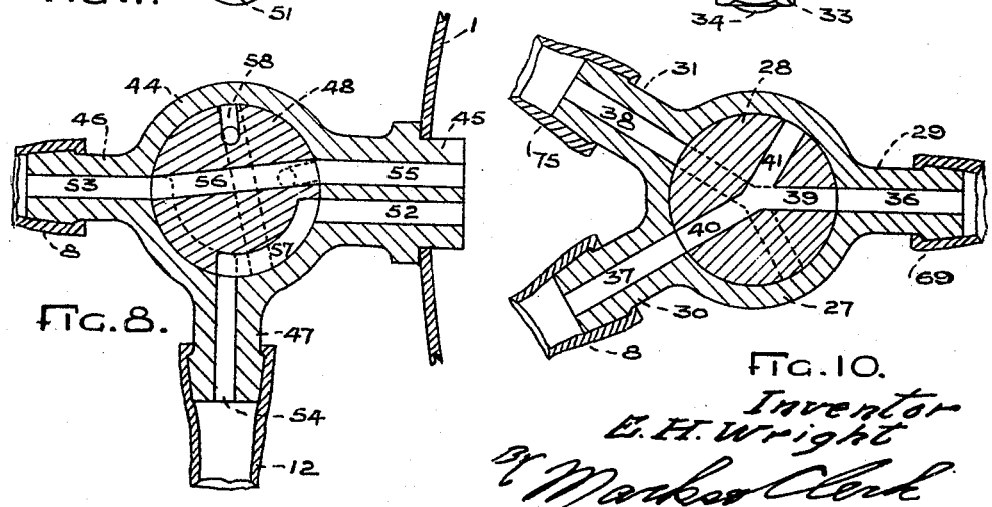

Patented Jan. 26, 1926.

1,571,080

UNITED STATES PATENT OFFICE.

ERNEST HENRY WRIGHT, OF MORRINSVILLE, AUCKLAND, NEW ZEALAND.

TESTING APPARATUS FOR USE IN COW MILKERS.

Application filed November 15, 1922. Serial No. 601,201.

*To all whom it may concern:*

Be it known that ERNEST HENRY WRIGHT, citizen of the British Empire, residing at the town of Morrinsville, in the Provincial District of Auckland, in the Dominion of New Zealand, has invented certain new and useful Improvements in Testing Apparatus for Use in Cow Milkers, of which the following is a specification.

This invention relates to apparatus for use in connection with cow-milkers whereby the milk of an individual cow may be separately tested for quality.

The object of my invention is to test an individual cow's milk whilst the milking of a number of cows by a cow-milking machine is going on without interrupting the milking of the other cows by the machine or the usual delivery of their milk into the usual overhead releaser or reservoir and such that when the individual cow's milk has been collected to the quantity desired the milking into the releaser of that cow's milk with that of the other cows can be readily resumed.

A leading feature of my invention is adapting and arranging a lid for a milk bucket of the type in every day use so that it can be placed on the ground to act as testing apparatus for use as above described with a cow-milking machine, hereinafter called a cow-milker, designed to milk a number of cows at the same time.

The object is effected by the apparatus hereinafter described and comprises a lid adapted to fit the milk bucket air tight, a milk pipe which leads from the teat cups of a cow-milker to said lid a vacuum pipe leading from said lid to the releaser of the cow-milker and means for independently connecting the ends of said pipes apart from said lid.

A subordinate feature of my invention is an arrangement comprising a transverse baffle plate in the bucket lid whereby milk is prevented from running across the lid and being drawn up the vacuum pipe and having a small hole in its centre to stop milk being drawn up into the vacuum system should the cups drop off when the bucket is filled. Its action is to admit air which would rush in through the dropped teat cups over the top of the milk and up the vacuum pipe so that the vacuum can have no suction effect on the milk and the milk cannot enter the vacuum system.

My invention is also carried out in particular by means comprising a special four way cock secured to the bucket lid and adapted and arranged for independently connecting the ends of the milk and vacuum pipes apart from the lid and for connecting said ends to entrances in the lid and which is also adapted for being used on cow-milkers separately for partially releasing the milk by means comprising the provision of a special air inlet in the cock.

The invention consists in these features and in the features and combinations and arrangements of parts herein described and more particularly pointed out in the claims. Referring to the accompanying drawings illustrating the invention Figure 1 is a sketch showing the invention with details of baffles, connections, flanged lid and joint on top of the bucket rim, Figure 2 is a sketch showing the method of making an air tight joint with the lid fitting inside of the bucket in accordance with my invention, Figure 3 is a view of the general arrangement of a cow milking plant showing the bucket attached, Figure 4 is a sketch showing a four way special cock according to my invention attached to the bucket lid, Figure 5 is a sketch showing the method of attaching three way cocks to the tube system according to my invention, Figure 6 is a sketch showing a single plug cock attachment to the tubes and lid according to my invention, Figure 7 is an elevation enlarged of the special four way plug cock according to my invention, Figure 8 is a sectional plan enlarged of the special four way plug cock, Figure 9 is an elevation enlarged of the three way plug cock used in my invention, Figure 10 is a sectional plan enlarged of the three way plug cock.

The general arrangement of parts of a cow milker comprising vacuum pipe, milk pipe, air pipe and one set of teat cups on a claw is shown in Figure 3. It is usual to denote the part of the vacuum pipe next the teat cups as the milk pipe and the part leading to the overhead pipes is called the vacuum pipe but at the beginning of milking operations the whole of the pipe becomes a vacuum pipe and when milk is drawn from a cow the whole of the pipe is filled with milk. This pipe is consequently called the vacuum pipe or the milk pipe indiscriminately. Milk is drawn from the cow's udder through the teat cups 71 by suction through milk pipe 63 which is connected with the claw 71ª and through vacuum pipe 69 which is connected with overhead vacuum pipe 66 which leads to any conveniently situated source of vacuum such as a releaser or chamber exhausted by an air pump known as a vacuum pump. Air is admitted in the usual way by the usual pulsator not shown through air pipe 65, cock 68 and rubber air pipe 64 to the claw 71$^b$ and teat cups 71 for the purpose of causing the pulsation of the inner lining of the teat cups in the well known way.

The cow is placed in the bail 72 in the usual manner and the testing milk bucket 18 is placed on the ground and hooked to the bail 72 to prevent it from being kicked over by the cow.

A glass inspection tube 62 see Figure 3 is placed between and connecting two portion 63 and 12 of the milk pipe and the other end of the portion 12 is connected with a cock 9 which is secured to the lid 1 of the bucket 18. The lower end 8 of the vacuum pipe 69 is connected with a metal tube 6 which is secured to and forms an entrance in the lid 1. A cock 70 is placed as usual on the vacuum pipe 69 near the bail for accessibility in shutting off or turning on the suction of the vacuum from a source of vacuum (not shown) in the well known way. An ordinary bucket 22 is shown in part in Figure 2 and a milk bucket 18 with some special features hereinafter described is shown in part in Figure 1.

The lid 1 and bottom 18$^a$ see Figure 3 of both buckets are made convex for the purpose of withstanding air pressure when the bucket is exhausted of air. When the bucket is of ordinary type 22 as shown in Figure 2 or is too large for the lid constructed in accordance with my invention, a rubber tube 21 is placed under the edge 1$^a$ of the lid 1 and is held there in position by a rim 20 secured to the lid 1 beneath the edge 1$^a$ so that when the vacuum acts on the bucket the lid 1 is drawn down and compresses the rubber tube 21 so as to cause it to adapt itself to the larger size bucket and to dents and irregularities that may arise in the bucket.

The milk bucket 18 shown in Figure 1 has its lid 1 provided with a flange 2 and rim 3 and the top of this bucket is provided with a round rim 17. The arrangement in this case is such that a plain rubber ring 4 is held on the rim 17 by the flange 2 and rim 3 of the lid of the bucket. When suction acts upon the bucket the flange 2 of the lid 1 and the rim 3 on the lid 1 compress the rubber ring 4 so as to form an air tight joint. The lid 1 is provided with a handle 5 for convenience.

In its simplest form my invention comprises two metal tubes 6 and 23 secured to and adapted to form entrances to the lid 1. On one of these metal tubes connecting means such as a rubber tube 8 is attached. This tube 8 may be the lower end of the milk pipe 69 see Figure 3 and on the tube 12 being detached from the inspecting tube 62 the end of the tube 8 can be connected instead as shown in dotted lines in Figure 3.

When the milking operation is desired to be continuous milking can now go on in the usual manner but when it is desired to make a test of a particular cow's milk separately tube 8 is detached from the inspection glass 62 and connected with the metal entrance 6 on the lid and the tube 12 is connected with the glass tube 62 and the lid is placed on the bucket. The bucket by the operation of the vacuum system of the cowmilker is rapidly exhausted of air and the milk now passes through to the bucket and fills it.

A cock 9 see Figure 3 may be used as part of the connection of the tube 12 to the entrance of the lid for convenience in turning off or on the suction from tubes 12 and 63. The same service is effected by cock 70 for tube 69 when desired.

In Figure 4 is shown the arrangement of the special four way cock 44 secured to the lid 1. Details of this cock 44 are shown in Figures 7 and 8. Branch 45 of this cock is secured to lid 1 see Figures 4, 7 and 8 and branch 46 is connected with the lower end of the tube 8 part of the vacuum tube 69 and branch 47 is connected with milk pipe 12 and 63 to the claw 71$^a$ and teat cups 71. When the cock is open as shown in Figure 8 the suction of the vacuum in tubes 8 and 69 operates through passages 53, 56 and 55 and causes a vacuum in the bucket 18 and the milk passes from the cow through teat cups 71 and tubes 63, 62 and 12 and passages 54, 57 and 52 in the cock into the bucket 18. If it is desired to stop this operation and that only part of the milk pass into the bucket 18 and milk is drawn to the releaser in the usual manner by giving the cock plug 48 a quarter turn by means of grip 61, see Figures 7 and 8 the distance being governed by the check pin 59 working in the race 60. By this quarter turn passages 52 and 55 are closed and passages 53 and 54 are connected by passage 57. By the small hole 58 drilled vertically down the plug 48 and then horizontally in alignment with passage 55, a small quantity of air is admitted into the bucket 18 so destroying the vacuum and thus enabling the lid 1 to be taken off or released from the bucket 18.

Figure 5 shows an arrangement using two 3 way cocks 27, 27$^a$ shown in detail in Figures 9 and 10. There are two metal tubes 6 and 23 fitted as entrances in lid 1 with a piece of tube 8 connected to the end of tube 6 the other end of the tube 8 being connected to branch 30 of cock 27. Branch 29 of cock 27 is connected to the vacuum pipe 69 and branch 31 is connected to branch 30$^a$ of cock 27ᴬ by a tube 76. Branch 31ᴬ of cock 27ᴬ is connected to the metal tube 23 on lid by tube 75 and branch 29ᴬ is connected to the milk pipe 12.

By turning the plug 28 by means of grip 35 so that passage 39, 40 are in alignment with passages 36, 37 and turning plug 28ᴬ by means of grip 35ᴬ, so that passages therein corresponding to 40, 41, are in alignment with passages corresponding to 36 and 38 the milk will pass into the bucket 18. By giving each plug 28 and 28ᴬ a sixth of a turn which is gauged by check pin 43 see Figure 9 in race 42 passages 37, 40, 39, 36 are closed and passages 38, 40, 41, 36 in cock 27 are opened and the corresponding passages in cock 27ᵃ are similarly closed and opened thus cutting off the milk from the bucket 18, and leading it to the releaser through tube 69 as in ordinary operation of the cowmilker.

Round the ends of each of these tubes 6 and 23 see Figures 1 and 2 which are inside the lid 1 is fitted a circular baffle 13, 14 which are for the purpose of preventing any drips from running down the lid and being sucked up the tubes 26 and 6, or 23 and 6.

The lid is also fitted with a central baffle plate 15 so that when the milk reaches the lower edge of this baffle 15 the draught of vacuum is automatically cut off from the tubes 26 and 12 or 23 and 12 as the case may be and the teat cups 71 then fall off the cow and air can then enter chamber A through these tubes. By means of an air inlet 77 from chamber A see Figure 1 admitting this air to chamber B, the vacuum in chamber B is reduced to such an extent that the milk cannot be drawn up vacuum pipe 6 which would take place if vacuum were operating at its ordinary strength.

I claim:

1. Apparatus for testing milk comprising a milk bucket lid having two entrances, a milk pipe, a vacuum pipe, means for independently connecting the ends of said pipe together apart from said lid and also for connecting said ends to said entrances, and a baffle surrounding the inner end of each entrance.

2. An apparatus as claimed in claim 1, characterized by the provision of a baffle plate carried by and dividing the lid into two chambers and provided with an air inlet.

In testimony whereof he affixes his signature.

ERNEST HENRY WRIGHT.